United States Patent [19]

Inaba et al.

[11] 4,442,521
[45] Apr. 10, 1984

[54] SWITCHING DEVICE FOR DETECTING INTERRUPTIONS IN TRANSMISSION LINES

[75] Inventors: Hajimu Inaba; Hideo Miyashita, both of Hino, Japan

[73] Assignee: Fujitsu Fanuc Limited, Tokyo, Japan

[21] Appl. No.: 295,318

[22] Filed: Aug. 24, 1981

[30] Foreign Application Priority Data

Sep. 1, 1980 [JP] Japan ................... 55-119828

[51] Int. Cl.³ .................................. G06F 11/00
[52] U.S. Cl. ............................. 371/68; 371/67; 371/70; 364/186
[58] Field of Search ............. 371/68, 67, 70, 62; 364/565, 186, 184, 119, 436, 424

[56] References Cited

U.S. PATENT DOCUMENTS 3,476,922 11/1961 Yiotis ...................... 371/68
4,236,215 11/1980 Callahan et al. ............ 364/565
4,298,982 11/1981 Auerbach .................. 371/67

FOREIGN PATENT DOCUMENTS 54-124903 9/1979 Japan ..................... 371/68
1396644 6/1975 United Kingdom .
2658521 6/1978 U.S.S.R. .................. 371/68

Primary Examiner—Jerry Smith
Assistant Examiner—Michael R. Fleming
Attorney, Agent, or Firm—Armstrong, Nikaido, Marmelstein & Kubovcik

[57] ABSTRACT

In a transmission system employing a plurality of parallel lines for transmitting serial digital signals, means are provided in each line for detecting and disconnecting any line on which transmission is interrupted comprising a converter for producing two signals of opposite polarity, a receiver for reconverting the signals connected to the converter by a pair of transmission lines, an exclusive OR gate connected to the pair of transmission lines for providing an output when normal signals of opposite polarity are present, and a switch comprising an AND gate converted to the receiver and to the exclusive OR gate which disconnects the receiver when no output is received from the exclusive OR gate. The received signals from each line are combined through a common OR gate.

2 Claims, 4 Drawing Figures

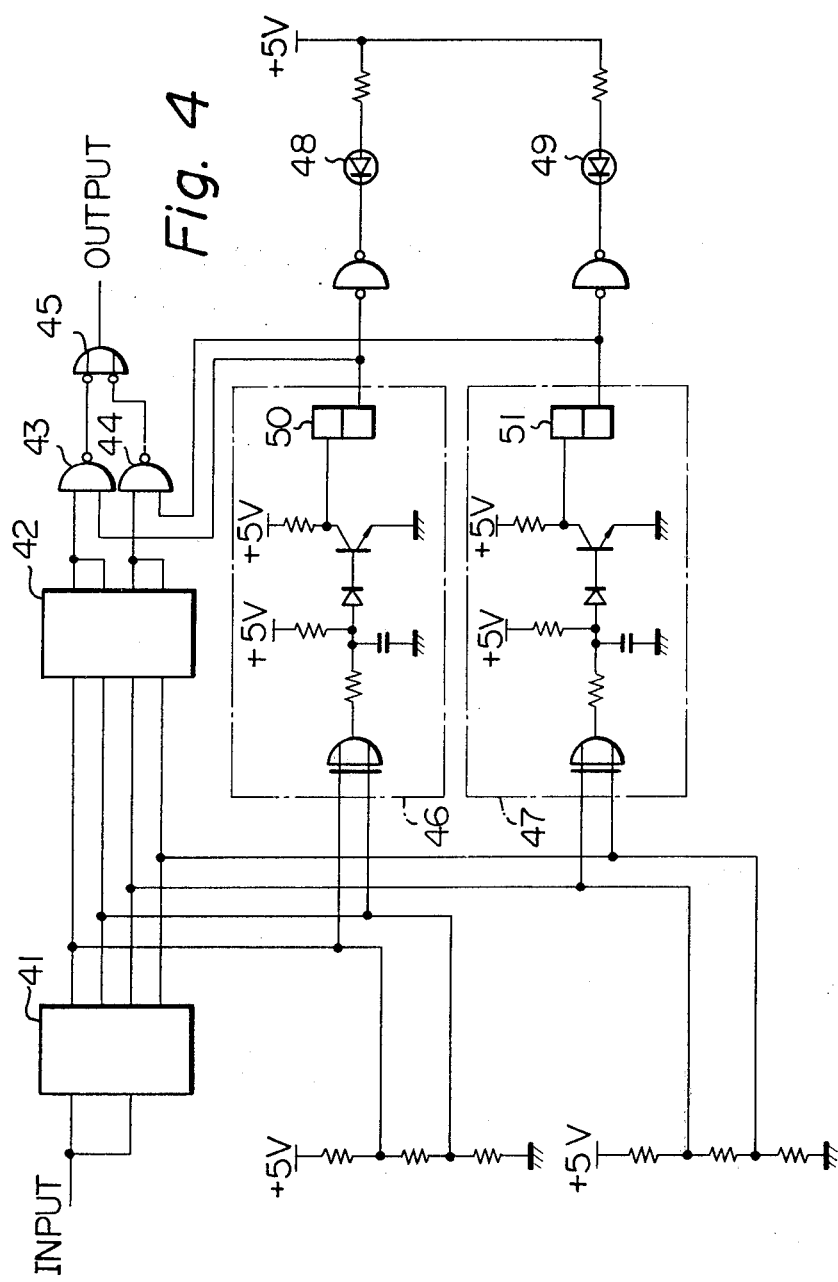

SWITCHING DEVICE FOR DETECTING INTERRUPTIONS IN TRANSMISSION LINES

BACKGROUND OF THE INVENTION

1. Field of the Invention

The present invention relates to a device for switching the transmission lines having a function of detecting an interruption of said transmission lines and an industrial robot using said device.

2. Description of the Prior Art

In equipment including a movable operating board and an installed type control apparatus (for example, a teaching and operating board, and a robot controlled apparatus in a machine tool system being operated with a robot), transmission lines which connect between the operating board (for example, the teaching and operating board) and the control apparatus (for example, the robot controlled apparatus) have usually performed an important function of information communication. In a method of information communication, one series of information is sent using a pair of lines as a set of digital signals, which signals have a different polarity from each other. Hitherto, the operating board, which is frequently moved, prevented the function thereof because of the disconnection of the transmission line between the operation board and the control apparatus.

The present invention is proposed to solve above mentioned problems.

SUMMARY OF THE INVENTION

The object of the present invention is to provide a device for switching the transmission lines, wherein, by the logical exclusive OR from a set of digital signals having an opposite polarity from each other and transmitting on a pair of transmission lines, the interruption of the transmission lines is detected, the interrupted lines are disconnected, and digital signals are sent through the other non-interrupted lines, and thus the transmitting signals are not interrupted.

According to one aspect of the present invention, there is provided a device for switching the transmission lines having a function of detecting an interruption of said transmission lines comprising: a plurality of pairs of transmission lines which can transmit sets of digital signals with the opposite polarity from each other; a plurality of drivers which send out said signals to said transmission lines; a plurality of receivers which receive said signals transmitted through said transmission lines; a plurality of AND gates which receive outputs from said receivers; an OR gate which receives the outputs from said AND gates; a plurality of exclusive OR gates which are connected with said each pair of transmission lines; and a plurality of filters which receive outputs from said exclusive OR gates and supply said AND gates with outputs thereof.

BRIEF DESCRIPTION OF THE DRAWINGS

FIG. 4 is a detailed circuit diagram of the device in FIG. 2, portions of which are changed.

DESCRIPTION OF THE PREFERRED EMBODIMENTS

Figure 1:
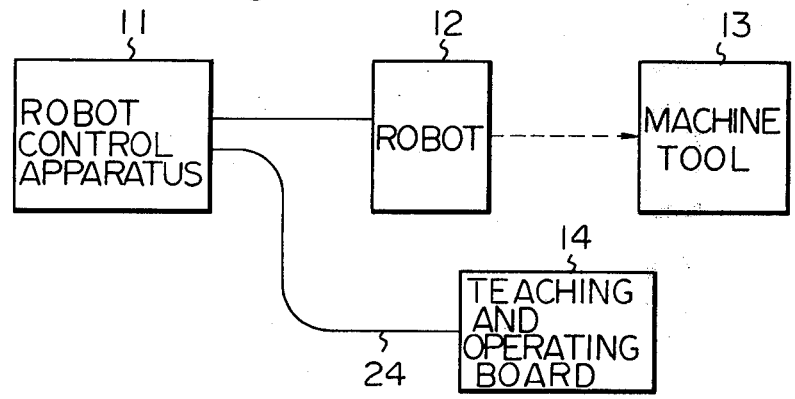
FIG. 1 is a block diagram illustrating the schematic constitution of an industrial robot in which the present invention is applied.
Figure 2:
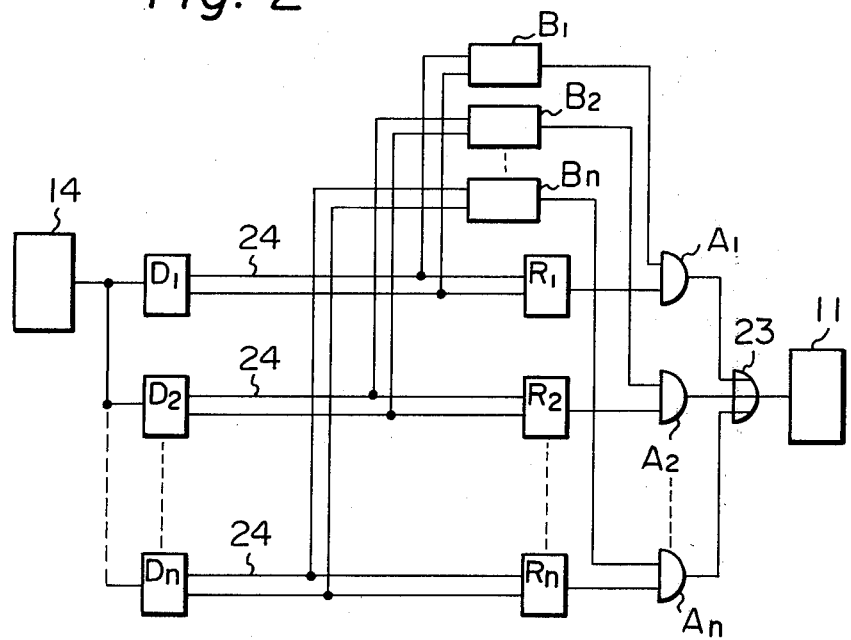
FIG. 2 is a schematic circuit diagram illustrating a device for switching the transmission lines having a function of detecting an interruption of said transmission lines according to an embodiment of the present invention.

A device for switching the transmission lines having a function of detecting an interruption of said transmission lines used for an industrial robot, according to an embodiment of the present invention, is shown in FIGS. 1 through 4. The device for switching the transmission lines according to the present invention is mainly applied to the transmission lines connected between a robot control apparatus 11 and a teaching and operating board 14. The schematic circuit diagram of the device for switching the transmission lines is shown in FIG. 2. The signals from the teaching and operating board 14 are supplied to the drivers $D_1$ through $D_n$, and the output lines from the drivers $D_1$ through $D_n$ connect with the receivers $R_1$ through $R_n$ through a pair of transmission lines 24 connecting each driver and receiver. The outputs from the receivers $R_1$ through $R_n$ are connected to the first input terminal of the AND gates $A_1$ through $A_n$, respectively. The lines branching from the lines 24 between the drivers and the receivers are connected to interruption detecting circuits $B_1$ through $B_n$, respectively, and the outputs from the interruption detecting circuits $B_1$ through $B_n$ are connected to the second input terminals of the AND gates $A_1$ through $A_n$, respectively. The outputs from the AND gates $A_1$ through $A_n$ are supplied to each input of an OR gate 23, and the output from the OR gate 23 is supplied to the robot control apparatus 11.

Figure 3:
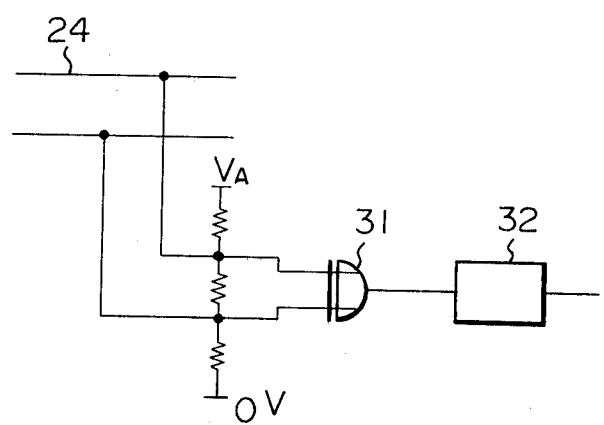
FIG. 3 is a circuit diagram illustrating an interruption detecting circuit of the device in FIG. 2.

In FIG. 3, the detail of the interruption detecting circuit is shown. A pair of lines branching from a pair of transmission lines 24 are connected to two inputs of an exclusive OR gate 31, respectively, and the output of the exclusive OR gate 31 is connected to a filter 32.

The operations of the above mentioned device for switching the transmission lines are described below. The signals from the teaching and operating board 14 are converted to pairs of signals with opposite polarity from each other at the driver $D_1$ through $D_n$, and the converted signals are sent out through the pairs of the transmission lines 24, respectively. The pairs of signals through the transmission lines 24 are received by the receivers $R_1$ through $R_n$, the received signals are reconverted to signals which are similar to the original signals prior to being converted by the drivers, and are applied to one of the terminals of the AND gates $A_1$ through $A_n$, respectively. Since the lines, branching from each transmission line 24, are supplied with pairs of signals having an opposite polarity from each other, by the logical operation of the exclusive OR derived from signals on a pair of lines, a logical output "1" is obtained when the transmission line is normal, i.e. when a signal is present. When the transmission line is disconnected, for example interrupted, the output of the exclusive OR gate 31 becomes logical "0"; thus, either a normal condition or an interrupted condition can be determined. Further, after transient fluctuations are filtered from the output signals of the exclusive OR gates 31 by passing through the filters 32, the output signals are connected to the AND gates $A_1$ through $A_n$, and then, only when there is no interrupted line, the outputs of the receivers can pass through the AND gates. Therefore, the circuits, the transmission lines of which are interrupted, are not conducted through the AND gates and can be separated from the other circuits, and the signals are transmitted through the other transmission lines. After the signals pass through the AND gate, the signals pass through the OR gate 23 and are sent to the robot control apparatus 11.

In FIG. 4, a more detailed circuit diagram of the device for switching the transmission lines having a function of detecting an interruption of said transmission lines, which has two pairs of transmission lines, is shown.

A driver 41 applied input signal is connected to a receiver 42 with two pairs of transmission lines, two outputs of the receiver 42 pass through AND gates 43 and 44, respectively, and the outputs are fed through an OR gate 45. The two pairs of the transmission lines are connected to interruption detecting circuits 46 and 47, respectively, and in the interruption detecting circuits the signal from the transmission lines passes through the exclusive OR gates, filters, flip-flops 50 and 51, and the output lines of the line detecting circuits are connected to light emitting diodes 48 and 49, and when the transmission line is disconnected, the line is indicated by the lighting of the light emitting diode. The outputs of the flip-flops 50 and 51 are also used for opening and closing signals of the AND gates 43 and 44.

Although in the above mentioned description, the case of using the device for switching the transmission lines having a function of detecting an interruption of said transmission lines applied to the industrial robot is described, the present invention can be utilized for other similar purposes.

We claim:

1. In an industrial robot having a teaching and operating board for teaching robot operation, a robot control apparatus for controlling a robot, and a plurality of transmission lines for connecting input signals from said teaching and operating board to said robot control apparatus, a device for detecting interruptions in said transmission lines and for switching said transmission lines comprising:

a plurality of driver means connected to said teaching and operating board for receiving robot control input signals therefrom, each of said driver means providing a first digital output signal corresponding to said robot control signal and a second digital output signal of polarity opposite to that of said first digital output signal;

a first transmission line connected to each of said driver means for carrying said first digital output signal and a second transmission line connected to each of said driver means for carrying said second digital output signal;

a receiver means connected to said first and second transmission lines from each of said driver means for reconverting said first and second digital output signals to a robot control output signal corresponding to said robot control input signal;

an interruption detecting circuit means comprising an exclusive OR gate and a transient filter connected to said first and second transmission lines from each of said driver means and operable to produce an output signal only when said first and second digital output signals received on said transmission lines are normal;

a switching circuit means comprising an AND gate having inputs connected respectively to the outputs of the receiver means and the interruption detecting circuit means of each of said driver means and providing an output only when signals are present at both inputs, whereby the receiver means output is disconnected if no interruption detecting circuit means output signal is present; and an OR gate having inputs connected to the outputs of each of said AND gates and an output connected to said robot control apparatus, whereby only robot control output signals from uninterrupted transmission lines are connected to said robot control apparatus.

2. A switching system for a plurality of parallel transmission lines carrying a serial digital signal between an input circuit and an output circuit comprising:

a plurality of driving means connected to said input circuit, each of said driving means producing a first digital output corresponding to said digital signal and a second digital output of opposite plurality to said first digital output;

a receiver means connected to each of said driving means for receiving said first and second digital outputs and reconverting them to produce an output signal corresponding to said digital signal;

an exclusive OR gate connected to each of said driving means having inputs for receiving said first and second digital outputs and providing an output only when said first and second digital outputs of opposite polarity are received;

an AND gate having inputs connected to the output of said receiver means and exclusive OR gate of each driving means, said AND gate functioning as a switch to stop passage of said receiver output signal if no exclusive OR gate output is present; and an OR gate having inputs connected to the outputs of each of said AND gates, for combining the output signals received from each receiver means.

* * * * *